United States Patent
Kim et al.

(10) Patent No.: US 12,238,457 B2
(45) Date of Patent: *Feb. 25, 2025

(54) APPLICATION PROCESSING METHOD FOR PROVIDING GROUP VIDEO CALL

(71) Applicant: KAKAO CORP., Jeju-si (KR)

(72) Inventors: Hyung Jin Kim, Seongnam-si (KR); Sung San Kim, Seongnam-si (KR); Hyo Jin Ham, Seongnam-si (KR); Tae Kyu Kim, Seongnam-si (KR); Young Wuk Seo, Seongnam-si (KR); Dae Nyeon Kim, Seongnam-si (KR); Seog Choi, Seongnam-si (KR); Ji Ah Lee, Seongnam-si (KR); Tae Jun Choi, Seongnam-si (KR); Taek Hoon Kim, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/342,738

(22) Filed: Jun. 28, 2023

(65) Prior Publication Data

US 2023/0336692 A1    Oct. 19, 2023

Related U.S. Application Data

(63) Continuation of application No. 17/563,052, filed on Dec. 28, 2021, now Pat. No. 11,722,640.

(30) Foreign Application Priority Data

Dec. 28, 2020 (KR) .................. 10-2020-0184808

(51) Int. Cl.
*H04N 7/15* (2006.01)
*G06F 9/54* (2006.01)
*H04L 12/18* (2006.01)

(52) U.S. Cl.
CPC ............. *H04N 7/157* (2013.01); *G06F 9/54* (2013.01); *H04L 12/1822* (2013.01)

(58) Field of Classification Search
CPC ........ H04N 7/157; H04L 12/1822; G06F 9/54
(Continued)

(56) References Cited

U.S. PATENT DOCUMENTS 7,612,793 B2   11/2009  Potekhin et al.
10,110,831 B2  10/2018  Takita et al.
(Continued)

FOREIGN PATENT DOCUMENTS

KR   10-2002-0023234 A   3/2002
KR   10-2015-0006235 A   1/2015
(Continued)

OTHER PUBLICATIONS

Jen Hill, "Filters, Reactions, Lighting & More! New Features to Liven up Your Meetings", Zoom Blog, <https://blog.zoom.us/filters-reactions-lighting-features-zoom-meetings-2/>, Aug. 4, 2020.
(Continued)

*Primary Examiner* — Maria El-Zoobi
(74) *Attorney, Agent, or Firm* — Seed IP Law Group LLP

(57) ABSTRACT

An application processing method for providing a group video call and a terminal for performing a group video call are disclosed. The application processing method of providing a group video call may include executing a group video call comprising a plurality of participants, based on a number of the participants, displaying views corresponding to the participants by pagination, based on a predetermined action of a first participant whose view is not displayed on a predetermined page of a plurality of pages generated by the pagination, selecting one of participants whose view is displayed on the predetermined page as a second participant, and displaying the views by swapping a position of the view
(Continued)

corresponding to the selected second participant and a position of the view corresponding to the first participant.

19 Claims, 13 Drawing Sheets

(58) Field of Classification Search
USPC .................................................. 348/14.02
See application file for complete search history.

(56) References Cited

U.S. PATENT DOCUMENTS

| | | | |
|---|---|---|---|
| 2010/0302346 A1* | 12/2010 | Huang | H04N 7/15 709/204 |
| 2011/0157298 A1 | 6/2011 | Huang et al. | |
| 2012/0050454 A1 | 3/2012 | Eisenberg et al. | |
| 2014/0245234 A1* | 8/2014 | Lee | G06F 3/0481 715/863 |
| 2014/0267560 A1 | 9/2014 | Bright-Thomas | |
| 2015/0128045 A1* | 5/2015 | Deng | H04N 7/181 715/720 |
| 2015/0201161 A1* | 7/2015 | Lachapelle | H04N 7/15 348/14.07 |
| 2016/0065894 A1* | 3/2016 | Lin | H04N 7/15 348/14.07 |
| 2016/0127686 A1 | 5/2016 | Nagase et al. | |
| 2016/0173823 A1* | 6/2016 | Duckworth | H04N 23/90 348/14.07 |
| 2016/0306504 A1* | 10/2016 | Brunsch | H04N 7/15 |
| 2018/0070050 A1 | 3/2018 | Hansen | |
| 2021/0120207 A1 | 4/2021 | Lee et al. | |

FOREIGN PATENT DOCUMENTS

| | | |
|---|---|---|
| KR | 10-2016-0061773 A | 6/2016 |
| KR | 10-2017-0112306 A | 10/2017 |

OTHER PUBLICATIONS

Jen Hill, "How to Use Accessibility Features With Zoom", Zoom, YouTube Webpage, <https://www.youtube.com/watch?v=h/WSoH3aMMg>, Sep. 23, 2020.

* cited by examiner

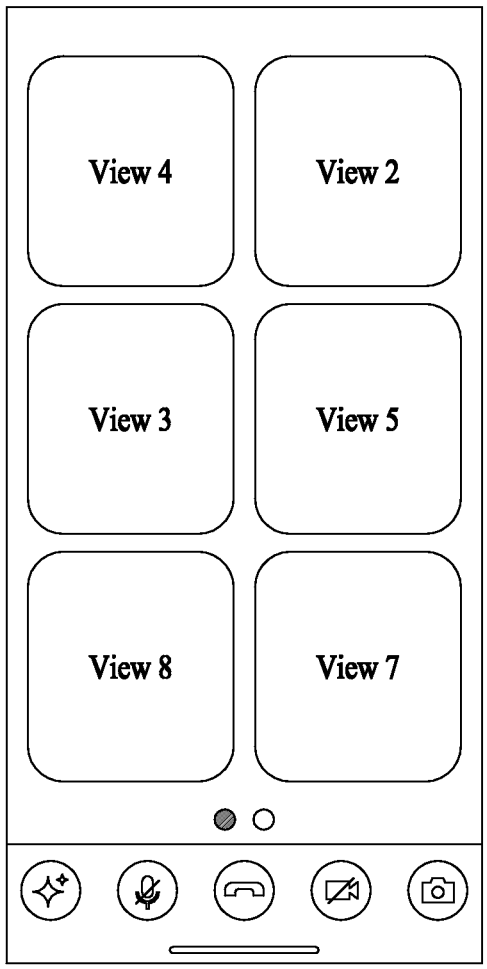 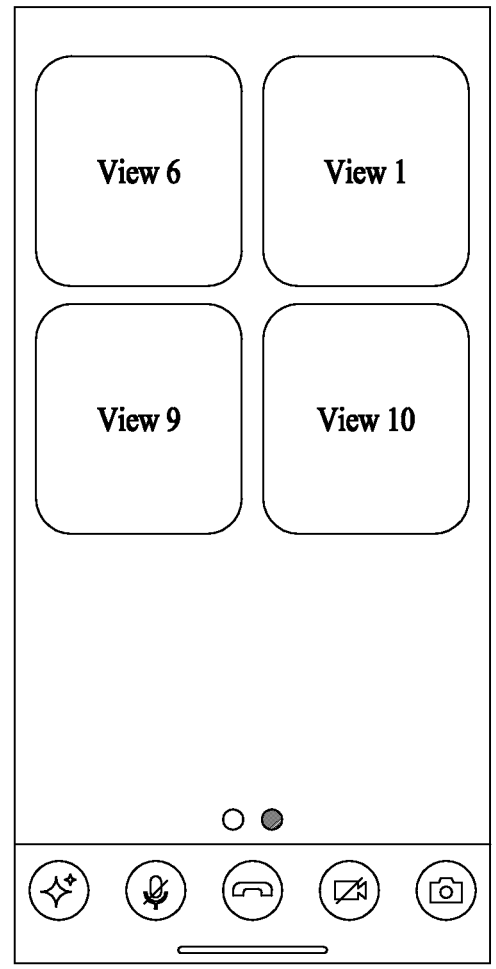
FIG. 6A
FIG. 6B

APPLICATION PROCESSING METHOD FOR PROVIDING GROUP VIDEO CALL

CROSS-REFERENCE TO RELATED APPLICATION

This application is a continuation of U.S. patent application Ser. No. 17/563,052, filed on Dec. 28, 2021, which claims priority to Korean Patent Application No. 10-2020-0184808 filed on Dec. 28, 2020, and all the benefits accruing therefrom under 35 U.S.C. § 119 and § 120, the contents of which in their entirety are herein incorporated by reference.

BACKGROUND

1. Field of the Invention

The following disclosure relates to an application processing method for providing a group video call and a terminal for performing a group video call.

2. Description of the Related Art

Recently, with the development of mobile smart devices, use of an online platform service to communicate with other users via network has increased. A representative example of an online platform service for communicating with other users is a social networking service (SNS), which is an online platform to generate and strengthen social relationships through communication among users, sharing information, and expanding personal connections and an instant messaging service (IMS), which is an online platform for real-time content communication between two or more users.

With the increase in communication via mobile device, online platform services are providing not only one-to-one communication with other users but also multilateral group voice calls and group video calls. There is a demand for development of a technique for smooth multilateral communication in a mobile environment.

SUMMARY

Example embodiments provide a technique to improve a user interface of a group video call between two or more participants in a mobile environment.

However, the technical aspects are not limited to the aforementioned aspects, and other technical aspects may be present.

According to an aspect, there is provided an application processing method of providing a group video call, the application processing method including executing a group video call including a plurality of participants, based on a number of the participants, displaying views corresponding to the participants by pagination, based on a predetermined action of a first participant whose view is not displayed on a predetermined page of a plurality of pages generated by the pagination, selecting one of participants whose view is displayed on the predetermined page as a second participant, and displaying the views by swapping a position of the view corresponding to the selected second participant and a position of the view corresponding to the first participant.

The predetermined action of the first participant may include an utterance of the first participant, and the selecting of the second participant may include, based on at least one of information on recent end-points of utterances and number of utterances of the participants whose views are displayed on the predetermined page, selecting one of participants whose view is displayed on the predetermined page as the second participant.

The selecting of the second participant further may include adding a sign as a notification as to a target of replacement on the view corresponding to the selected second participant.

The application processing method may further include, when a third participant among the participants leaves the group video call, deleting a view corresponding to the third participant displayed on one of the plurality of pages, and in case the view corresponding to the third participant is deleted from the predetermined page, changing a position of a view corresponding to a fourth participant whose view is not displayed on the predetermined page to a position on the predetermined page.

The application processing method may further include deleting a page not including a view corresponding to a participant among the plurality of pages.

The displaying of the views by the pagination may include based on a number of the participants, determining a layout of pages on which the views corresponding to the participants are displayed, and placing the views corresponding to the participants on areas in the pages based on the layout.

The participants may include users of the application.

The placing of the views corresponding to the participants may include placing a view corresponding to a user of the application on a predetermined area of a predetermined page.

The displaying of the views by the pagination may include based on the number of participants and a limit on a number of views to be included in one page, generating pages on which the views corresponding to the participants are displayed, and placing the views corresponding to the participants on the pages based on a predetermined order among the participants.

The application processing method may further include generating a new page based on a changed number of participants when a new participant is added to the group video call, and placing a view corresponding to the new participant on the new page.

The displaying of the views by the pagination may include displaying the predetermined page of the plurality of pages generated by the pagination on a display, and based on a page transition input received from a terminal in which the application is installed, displaying another page generated by the pagination on the display.

The application processing method may further include receiving an input for sending an emoticon to at least one of the participants from a user of the application, and based on the input for sending the emoticon, displaying the emoticon by overlaying the emoticon on a view corresponding to at least the one of the participants.

The application processing method may further include receiving an emoticon sent to the user of the application from at least one of the participants, and displaying the received emoticon by overlaying the received emoticon on the view corresponding to the user of the application.

Each of the views corresponding to the participants may include at least one of a camera view to display a video captured by a terminal of a corresponding participant, and an image view to display a set image to the corresponding participants.

The executing of the group video call may include receiving a request for the group video call via a chatroom, and executing the group video call including a plurality of participants in the chatroom.

The executing of the group video call may include receiving a request for the group video call via a chatroom, in case a number of the participants in the chatroom exceeds a predetermined value, providing an interface whereby a number of participants less than the predetermined value may be selected from among the participants in the chatroom, sending a request to generate a new chatroom including the selected participants to a server, and executing the group video call including participants in the new chatroom.

The selecting of the second participant may include receiving information of the second participant from a server, and the second participant may be selected based on the predetermined action of the first participant in the server.

According to an aspect, there is provided a terminal including at least one processor configured to execute a group video call including a plurality of participants, based on a number of the participants, display views corresponding to the participants by pagination, based on a predetermined action of a first participant whose view is not displayed on a predetermined page of a plurality of pages generated by the pagination, select one of participants whose view is displayed on the predetermined page as a second participant, and display the views by swapping a position of the view corresponding to the selected second participant and a position of the view corresponding to the first participant.

The processor may be configured to, in the selecting of the second participant, based on at least one of information on recent end-points of utterances and number of utterances of the participants whose views are displayed on the predetermined page, selecting one of participants whose view is displayed on the predetermined page as the second participant.

The processor may be further configured to, in the selecting of the second participant, add a sign as a notification as to a target of replacement on the view corresponding to the selected second participant.

The processor may be further configured to, when a third participant among the participants leaves the group video call, delete a view corresponding to the third participant displayed on one of the plurality of pages, in case the view corresponding to the third participant is deleted from the predetermined page, change a position of a view corresponding to a fourth participant whose view is not displayed on the predetermined page to a position on the predetermined page, and delete a page not including a view corresponding to a participant among the plurality of pages.

The processor may be further configured to, generate a new page based on a changed number of participants when a new participant is added to the group video call, and place a view corresponding to the new participant on the new page.

The processor may be further configured to, in the displaying of the views by the pagination, based on a number of the participants, determine a layout of pages on which the views corresponding to the participants are displayed, and place the views corresponding to the participants on areas in the pages based on the layout.

The processor may be configured to, in the executing of the group video call, receive a request for the group video call via a chatroom, in case a number of the participants in the chatroom exceeds a predetermined value, provide an interface whereby a number of participants less than the predetermined value may be selected from among the participants in the chatroom, send a request to generate a new chatroom including the selected participants to a server, and execute the group video call including participants in the new chatroom.

The processor may be further configured to, in the selecting of the second participant, receive information of the second participant from a server.

The second participant may be selected based on the predetermined action of the first participant in the server.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A to 6B illustrate an example of a first page and a second page displayed on a terminal of another user;

DETAILED DESCRIPTION

Figure 1:
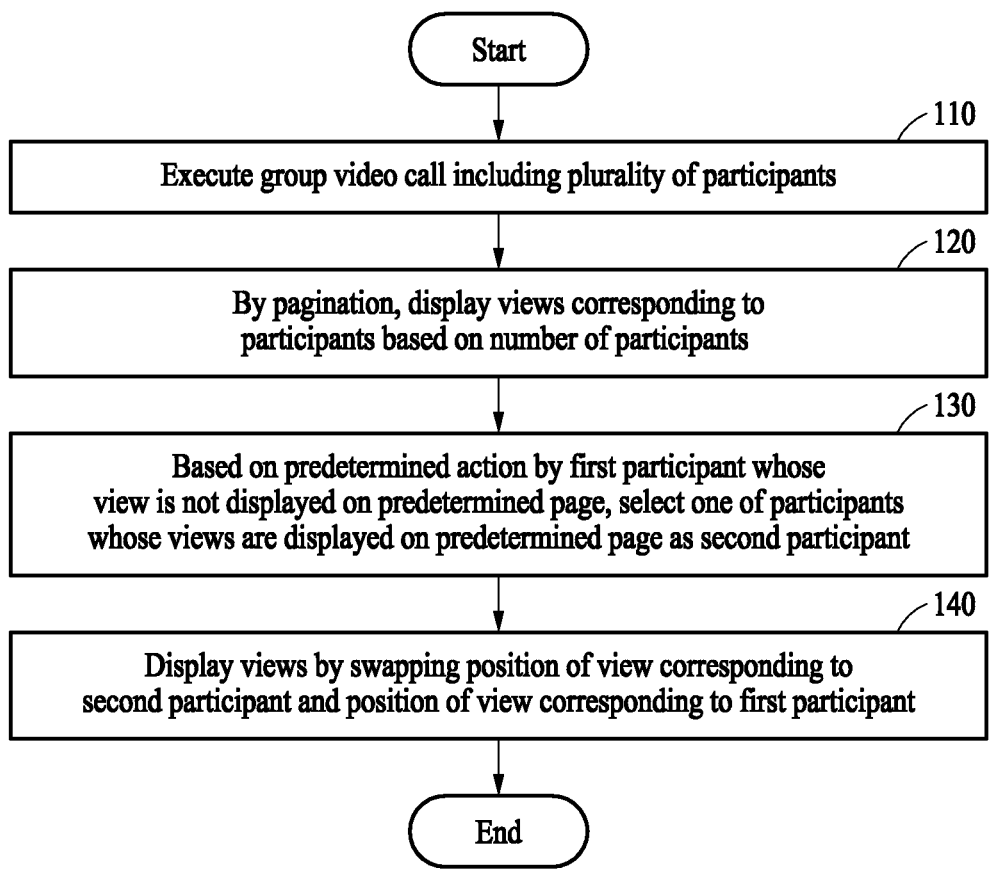
FIG. 1 is a flowchart of an application processing method of providing a group video call.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a flowchart of an application processing method of providing a group video call.

Referring to FIG. 1, an application processing method of providing a group video call may include operation 110 of executing a group video call including a plurality of participants, operation 120 of, based on a number of the participants, displaying views corresponding to the participants by pagination, operation 130 of, based on a predetermined action of a first participant whose view is not displayed on a predetermined page, selecting one of participants whose views are displayed on the predetermined page as a second participant, and operation 140 of displaying the views by swapping a position of the view corresponding to the selected second participant and a position of the view corresponding to the first participant.

According to an example, the application may be installed in a terminal of a user and may provide a group video call between two or more participants including the user. The user terminal may be one of electronic devices such as a computer, a portable computer, a wireless phone, a mobile phone, a smart phone, a personalized digital assistant (PDA), a web tablet, and may be any device that may include a display and may install and execute an application. The application may provide a user interface (UI) to a terminal in which the application is installed. The user terminal may perform operations of configuring a screen for a group video call, inputting data, transmitting and receiving data, and storing data via the UI provided by the application. A configuration of the apparatus according to an example is described below.

Operation 110 of executing a group video call may correspond to an operation of executing a group video call including a user of the application as a participant. For example, in response to a request for a group video call of which a recipient is the user, the application may provide a UI to the user to receive a response whether to participate in the requested group video call or not and may execute the group video call including the user as a participant based on the response of participation by the user. For example, in response to a request from a user for a group video call including at least one participant the application may deliver the request and may execute the group video call including the user as a participant based on a response, the response being participation by another participant.

According to an example, a group video call may be generated based on a chatroom. Here, the chatroom may be a group chatroom in which three or more users are participating including the user. For example, the user may send a group video call request to the participant(s) of the chatroom via the chatroom in which the user is participating. In addition, via the chatroom in which the user is participating, the user may receive a request for a group video call from another participant in the chatroom. The group video call generated based on the chatroom may include at least one of the participants in the chatroom as a participant of the group video call. When a group video call is requested via the chatroom, the application may execute the group video call including the participants of the corresponding chatroom.

When a group video call is requested via the chatroom, the application may generate a new chatroom based on a number of the participants in the chatroom and may execute the group video call including participants in the new chatroom. The new chatroom may include at least a number of the participants in the current chatroom. For example, when a number of participants in a chatroom in which a group video call is requested exceeds a predetermined value (for example, 10 participants), a new corresponding chatroom may be generated including a number of participants less than the predetermined value from among the participants in the corresponding chatroom. When a number of participants in a chatroom in which a group video call is requested exceeds a predetermined value, the application may provide an interface to the user who requests the group video call whereby the user may select a number of participants that is less than the predetermined value from among the participants in the corresponding chatroom. The application may send a request to a server to generate a new chatroom including the selected participants and may execute the group video call in the newly generated chatroom.

The application may control a user terminal by a UI to display views corresponding to participants in a group video call on a display. The view may be a configuration of a screen on which contents are showing via a display. The view corresponding to the participant may include at least one of a camera view displaying a video image captured by a terminal of the corresponding participant and an image view displaying a set image corresponding to the participant. The view corresponding to the participant may be determined based on a setting of the corresponding participant. For example, based on the setting of the participant, the camera view or the image view may be displayed. An example of displaying a view corresponding to a participant based on a setting of the participant is described below with reference to FIG. 10.

Operation 120 may correspond to an operation to display views corresponding to a plurality of participants by pagination to display the views on a limited display of a user terminal.

Pagination or paging may be segmenting items to be displayed on a display, page by page. A page may be a unit to be displayed in one screen through a display. Pagination may be generating at least one page based on a number of items to be displayed and a limit on a number of items that may be included in one page and allocating the items to be displayed to each of the generated pages. As a result of pagination, the generated pages including the segmented items may be connected with each other and may be switched from a predetermined page to another page.

For example, in case a page is limited and may only include 6 items and there are 10 items to be displayed, the items may be divided, 6 of the items may be included on a first page and 4 of the items may be included on a second page. In addition, based on a user input (for example, an input by swiping or an input by clicking on a page index displayed on a screen), a screen may be changed from displaying the first page to displaying the second page, and from displaying the second page to displaying the first page.

Operation 120 may include an operation of generating pages to display views corresponding to participants based on a number of the participants and a limit on a number of views that may be included in one page. A limit may be set on a number of views that a page provided by the application may include. In other words, a number of views that may be included in one page may be restricted to the set limit. When a number of participants exceeds the limit, a plurality of pages may be generated by pagination to display views corresponding to the participants.

A predetermined page among the plurality of pages may be priorly displayed on a display and a page to be changed based on a transition input may be designated by each of the pages. For example, an order may be determined among the plurality of pages and based on the order it may be determined that a first page shall be priorly displayed on a display. Based on a page transition input of a user, a displayed page may be changed to a page corresponding to a next page in the ordered sequence of pages. The page transition input of the user may include an input to indicate a transition direction, for example, when the page transition input corresponds to an input to change a page to a previous page, the page may be changed to a page corresponding to a previous page in the ordered sequence and when the page transition input corresponds to an input to change a page to a next page, the page may be changed to a page corresponding to the next page in the ordered sequence.

Operation 120 may include an operation of placing the views corresponding to the participants on the generated pages based on a predetermined order among the participants. For example, the predetermined order among the participants may correspond to an order of participation in a group video call. Based on the predetermined order, the views corresponding to the participants may be allocated to one of the generated pages and may be displayed on a display, page by page. As a result of allocating, a portion of the views may be included in a predetermined page to be priorly displayed on a display and another portion of the views may be included in a page to which the priorly displayed page is to be changed by a transition input.

Operation 120 may include an operation of determining a layout of pages on which the views corresponding to the participants are displayed based on a number of the participants and an operation of placing the views corresponding to the participants on areas in the pages based on the layout. The determining of the layout of pages may include planning a page on which a plurality of views is to be placed. For example, a layout may be determined whereby views are equally allocated horizontally, m squares are equally allocated horizontally, and n squares are equally allocated vertically.

When the page layout is determined, the views corresponding to the participants may be placed on areas in the page based on the layout. An area on which a view corresponding to a participant is placed may be determined based on a predetermined order among the participants.

Figures 2A, 2B:
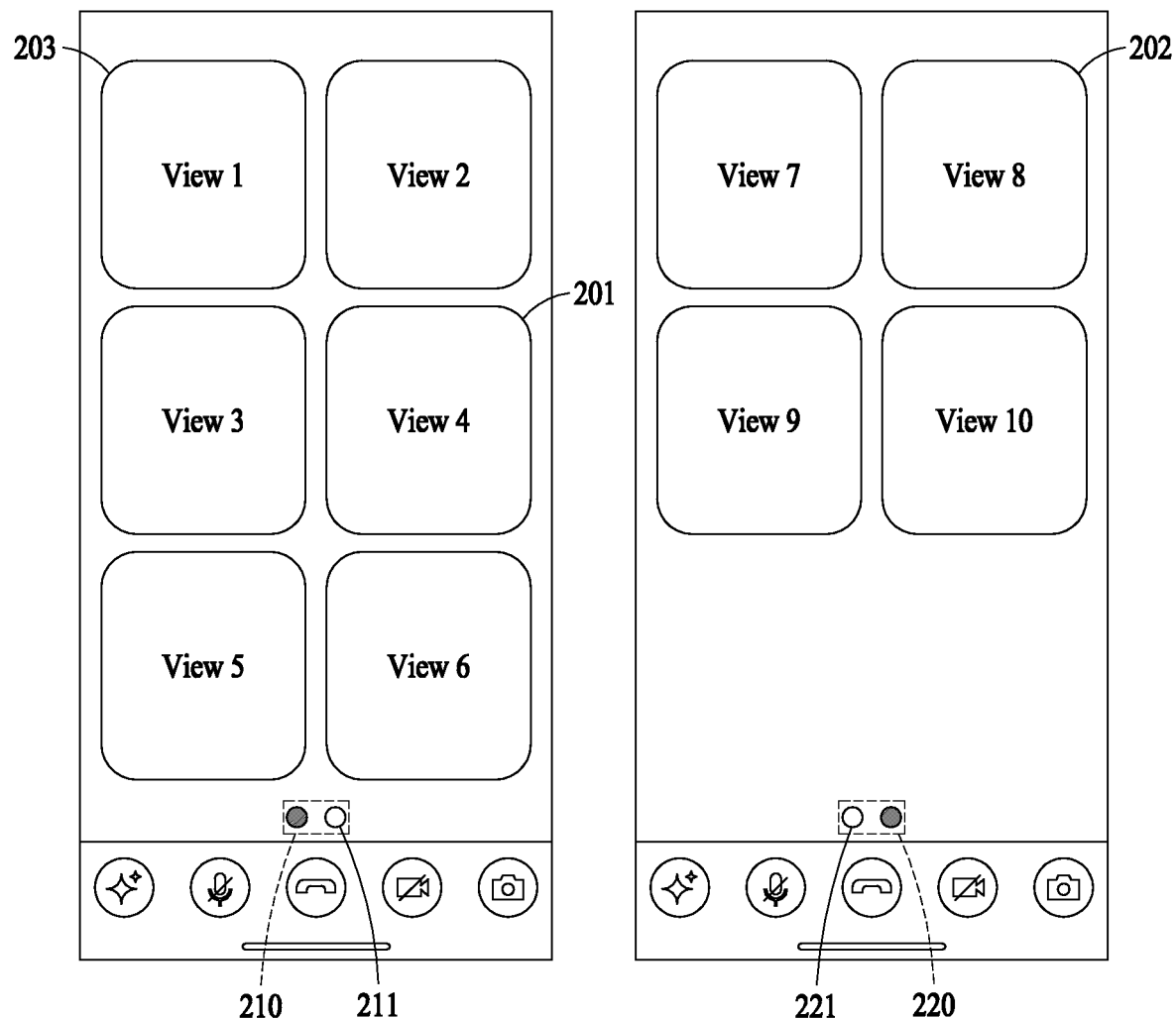
FIGS. 2A and 2B illustrate an example of a user interface screen to display a page showing an arrangement of views corresponding to participants of a group video call.

For example, FIGS. 2A and 2B illustrate an example of a UI screen to display a page showing an arrangement of views corresponding to participants of a group video call. More specifically, FIG. 2A illustrates a UI screen displaying a first page on which 6 views out of 10 views are placed and FIG. 2B illustrates a UI screen displaying a second page on which the remaining 4 views are placed. Referring to FIGS. 2A and 2B, based on a determined layout that places two equal squares horizontally and three equal squares vertically, 10 views, that is, Views 1 to 10, corresponding to 10 participants may be placed on two pages. Based on an order of the participants, the views corresponding to the participants may be divided into two pages and may be placed on areas of each of the pages.

In response to a group video call being executed, as shown in FIG. 2A, a screen displaying the first page may be provided to a user via a display of a terminal and may be changed to a screen displaying the second page shown in FIG. 2B in response to a page transition request from the user. The user may request page transition through an input by a swipe or an input by a click on an interfacing object for page transition displayed on a screen.

For example, referring to FIGS. 2A and 2B, a UI displaying a page may include interfacing objects 210 and 220 for page transition. The interfacing objects 210 and 220 may be an object that generates an action for page transition in response to a click input of a user. The interfacing object 210 may indicate a number of pages and a relative position of a currently displayed page by a number and colors of displayed figures.

In response to an input by a click on the interfacing object 211 indicating the second page on a screen displaying the first page of FIG. 2A, the screen may be changed to displaying the second page of FIG. 2B. In addition, in response to an input by a click on the interfacing object 221 indicating the first page on a screen displaying the second page of FIG. 2B, the screen may be changed to displaying the first page of FIG. 2A.

Figure 3:
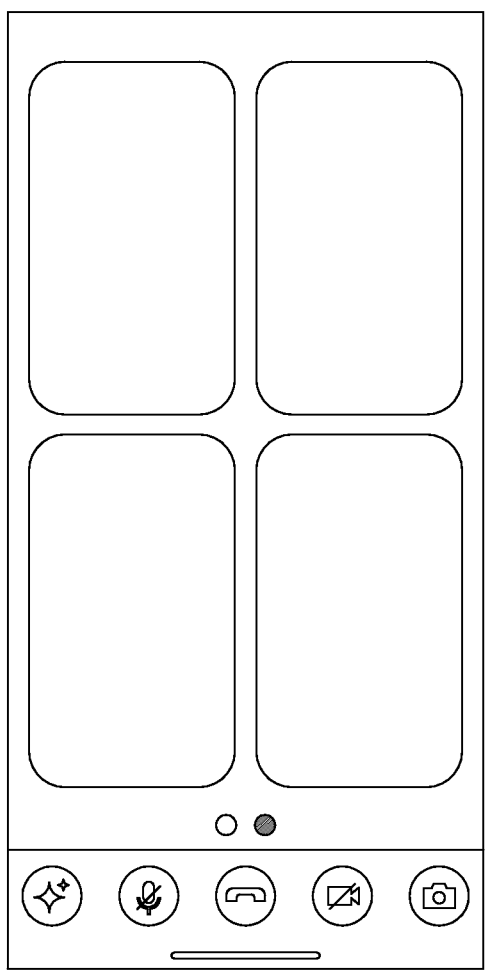
FIG. 3 illustrates an example of a layout of a page.

A layout may vary based on a number of views to be included in a page. For example, in case 6 views are placed on the first page and 4 views are placed on the second page, as shown in FIG. 2B, a layout of the second page may be determined to be the same as the layout of FIG. 2A, and thus, the views corresponding to the participants may be displayed on 4 areas. Meanwhile, as shown in FIG. 3, although the layout of the first page divides the screen into 4 equal areas a different layout may be determined for the second page based on a number of views to be displayed on the second page. In other words, depending on a number of views to be included in a page, a layout to place the views may vary and a size and structure of an area to display the views may vary.

Referring to FIG. 1, operation 130 may correspond to an operation of the application of selecting one of participants whose view is displayed on a predetermined page as a second participant based on a predetermined action of a first participant whose view is not displayed on the predetermined page among a plurality of pages generated by pagination. The predetermined page may correspond to a page priorly displayed on a display in response to a group video call being executed. The predetermined page may be determined to be a first page of the plurality of pages generated by pagination.

The operation of selecting one of participants whose view is displayed on the predetermined page as the second participant based on the predetermined action of the first participant may be performed in a server. A terminal or an application installed in the terminal may receive information of the selected second participant from the server.

The predetermined action of the first participant may include at least one of predetermined actions recognizable by the application such as an utterance, sending an emoticon, a gesture, changing a mute setting, and changing a setting on a corresponding view. For example, operation 130 may be performed when the first participant speaks, the first participant sends an emoticon in a group video call, a predetermined gesture (for example, raising a hand, marking a circle) is recognized in a camera view corresponding to the first participant, the first participant turns off a mute setting, and/or a view corresponding to the first participant is changed from an image view to a camera view.

In case the predetermined action of the first participant includes an utterance of the first participant, a sound signal received from the first participant may be recognized as the utterance based on a predetermined criterion. The predetermined criterion to recognize a sound signal as an utterance may include a criterion based on a magnitude, frequency, and duration of the sound signal. For example, a score may be calculated in consideration of a magnitude of a sound signal and a form of frequency of the sound signal and in case the calculated score exceeds the predetermined criterion, the sound signal may be recognized as an utterance.

In operation 130, to select the second participant, conditions related to an utterance, sending an emoticon, a predetermined gesture (for example, raising a hand, marking a circle) recognized in a camera view, and a setting on a corresponding view may be considered.

Operation 130 may include an operation of, based on at least one of information on recent end-points of utterances and number of utterances of the participants whose views are displayed on the predetermined page, selecting one of participants whose view is displayed on the predetermined page as the second participant. For example, the second participant may be determined to be a participant having the least recent end-point of an utterance among participants whose views are displayed on a predetermined page. As another example, the second participant may be determined to be a participant having the lowest number of utterances among the participants whose views are displayed on the predetermined page.

The criterion for selecting the second participant may include conditions related to speech other than a recent end-point of an utterance and other than a number of utterances. For example, the second participant may be determined to be a participant who turns on a mute setting among the participants whose views are displayed on the predetermined page. More specifically, among the participants who turn on a mute setting, a participant who turned on a mute setting most recently or least recently may be selected as the second participant. When a predetermined participant turns on the mute setting, transmission of a signal that is input from a microphone of a terminal of the corresponding participant may be restricted in a group video call.

In operation 130, the second participant may be selected based on a condition other than a condition related to an utterance. For example, a participant who sent an emoticon least recently, a participant whose predetermined gesture (for example, raising a hand, marking a circle) is recognized in a camera view least recently, or a participant who does not set the corresponding view to a camera view, may be selected as the second participant.

The second participant may be selected by comprehensively considering a plurality of conditions related to speech, sending an emoticon, a predetermined gesture recognized in a camera view, and a setting on a corresponding view. For example, when two or more participants have similar recent end-points of an utterance, the participant having the lowest number of utterances may be selected to be the second participant. Alternatively, a participant having the least recent end-point of an utterance among participants whose corresponding views are not set to a camera view, may be selected as the second participant.

Hereinafter, in operation 130, in response to an utterance of the first participant, an example of selecting the second participant based on a number of utterances or recentness of an end-point of an utterance, is described.

When the second participant is selected, a sign to notify a target of replacement may be added to a view corresponding to the second participant. By the sign, the application may notify participants in a group video call that the view corresponding to the second participant may be replaced by a view corresponding to another participant. An animation effect may be added to the sign to notify the target of replacement. For example, an animation effect may be added to an edge of the view corresponding to the second participant whereby the edge blinks as notification that the view corresponding to the second participant may be replaced by the view corresponding to another participant via a UI.

When the second participant is selected, a position of the view corresponding to the second participant may be swapped with a position of the view corresponding to the first participant. In case the first participant whose view is not displayed on a predetermined page speaks, a configuration of a page may be changed to display a view corresponding to a participant who is currently speaking by swapping a position of the view corresponding to the first participant with a position of the view corresponding to the second participant that is displayed on the predetermined page. The application may control a UI to display participants who recently spoke or users who frequently speak on a same page by changing the configuration of page according to operation 140.

Figure 4A:
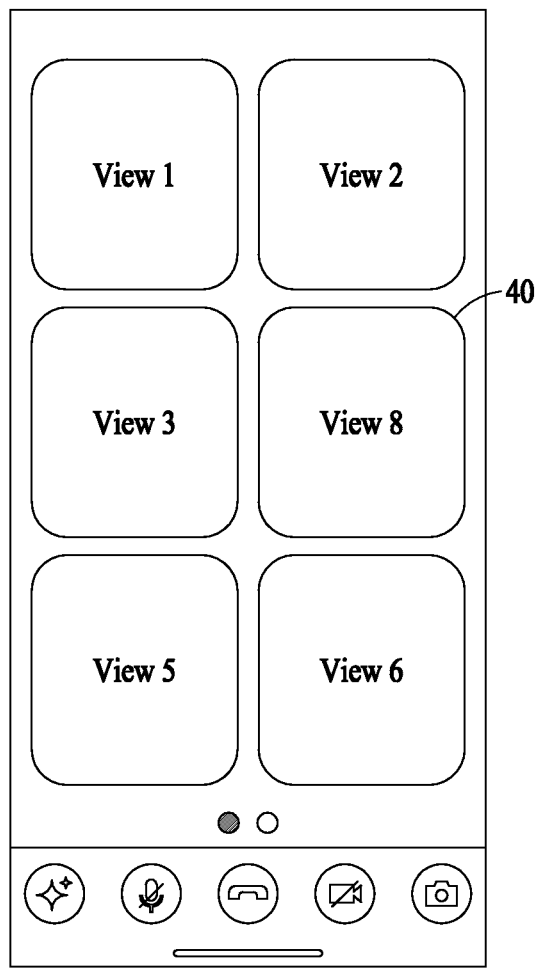
FIGS. 4A and 4B illustrate an example of operations of swapping a position of a view based on an utterance of a participant.
Figure 4B:
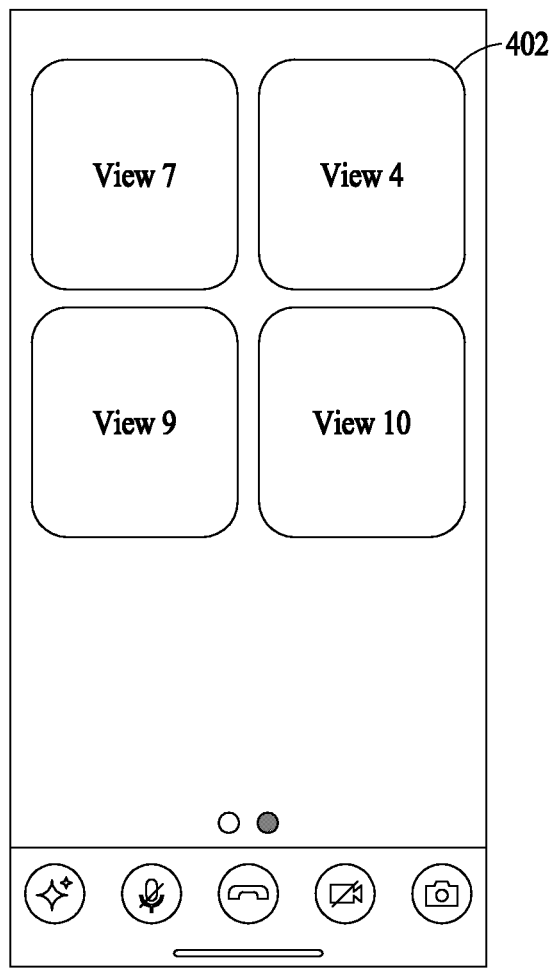

Described below is an example of a first page configured as illustrated in FIG. 2A, a second page configured as illustrated in FIG. 2B, the first page corresponding to a predetermined page. When a first participant is among participants whose views are displayed on the second page of FIG. 2B, a second participant may be selected from among participants whose views are displayed on the first page which is a predetermined page, based on a number of utterances or recentness of an end-point of an utterance. Supposing the view corresponding to the first participant is View 8 of FIG. 2B displayed on an area 202 in the second page and the view corresponding to the second participant is View 4 of FIG. 2A displayed on an area 201 in the first page, a position of View 8 corresponding to the first participant may be swapped with a position of View 4 corresponding to the second participant. FIGS. 4A and 4B may show a result of a swap. Referring to FIG. 4A, instead of View 4 corresponding to the second participant, View 8 corresponding to the first participant may be displayed on an area 401 in the first page which is the same as the area 201 in the first page of FIG. 2A. Referring to FIG. 4B, instead of View 8 corresponding to the first participant, View 4 corresponding to the second participant may be displayed on an area 402 of the second page which is the same as the area 202 of the second page of FIG. 2B.

Since participants in a group video call include a user of a terminal in which the application is installed, a view corresponding to the user of a terminal in which the application is installed may be placed on one page of a plurality of pages generated by pagination. The view corresponding to the user may be placed on a predetermined area in a predetermined page. In other words, the view corresponding to the user may be fixed to the predetermined area in the predetermined page and views corresponding to other participants except for the user may be placed on the remaining area. Based on an order among the participants except for the user of the application, the views corresponding to other participants may be placed on an area excluding an area on which the view corresponding to the user is placed. A configuration of a page displayed on a terminal of each user who participates in a same group video call wherein views corresponding to the participants are placed on the page may vary as a position of the view corresponding to the user is fixed.

Figure 5A:
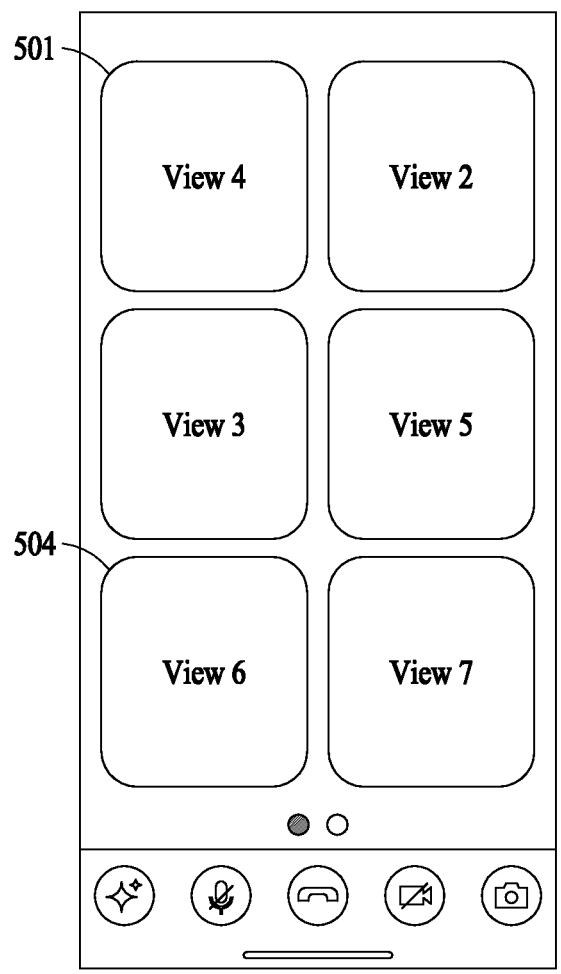
Figure 5B:
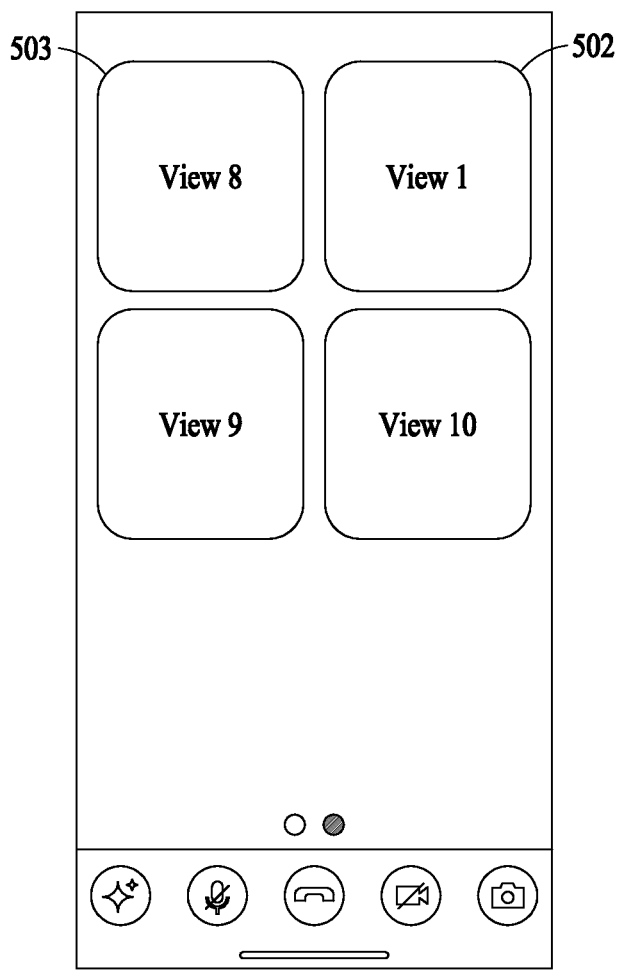

For example, when screens shown in FIGS. 2A and 2B are screens of the first page and the second page displayed on a terminal of the first user who participates in a group video call, screens shown in FIGS. 5A and 5B may correspond to screens of the first page and the second page displayed on a terminal of the second user who participates in the same group video call with the first user at the same time the first user is participating. Referring to FIGS. 2A, 2B, 5A, and 5B, pages displayed on the terminal of the second user may include views, that is, Views 1 to 10, corresponding to participants in a group video call that are the same as pages displayed on the terminal of the first user, however, a configuration of pages displayed on the terminal of the first user and a configuration of pages displayed on the terminal of the second user may be different.

Referring to FIG. 2A, View 1 corresponding to the first user may be placed on an area 203 in the first page and may be displayed on the terminal of the first user. Meanwhile, referring to FIG. 5A, View 4 corresponding to the second user may be placed on an area 501 in the first page that may be identical to the area 203 on which the view corresponding to the first user is placed as shown in FIG. 2A and may be displayed on a terminal of the second user. Referring to FIG. 5B, View 1 corresponding to the first user may be placed on an area 502 of the second page based on a predetermined order among the participants and may be displayed on the terminal of the second user.

Since a view corresponding to a user is fixed to a predetermined area, the user may not be selected as the second participant in operation 130. In other words, operation 130 may include an operation of selecting one of participants whose view is displayed on the predetermined page as the second participant, except for the user.

For example, when a configuration of pages displayed on a terminal of the first user is changed from the configuration of FIGS. 2A and 2B to the configuration of FIGS. 4A and 4B based on an utterance of a participant corresponding to View 8 of FIGS. 2A and 5B, a configuration of pages displayed on a terminal of the second user may be changed from the configuration of FIGS. 5A and 5B to the configuration of FIGS. 6A and 6B.

More specifically, referring to FIG. 5B, when the first participant corresponding to View 8 placed on an area 503 in the second page speaks, the second participant may be selected based on a number of utterances or recentness of an end-point of an utterance from among participants whose views are displayed on the first page except for the second user. Even if the second user has the lowest number of utterances or the least recent end-point of an utterance among the participants whose views are displayed on the first page, the second user may not be selected as the second participant who is a target of replacement and the second participant may be selected from among the participants whose views are displayed on the first page except for the second user. When a view corresponding to the selected second participant corresponds to View 6 displayed on an area 504 in the first page of FIG. 5A, a position of View 8 corresponding to the first participant may be swapped with a position of View 6 corresponding to the second participant. The result of a swap is illustrated in FIGS. 6A and 6B.

Figure 7A:
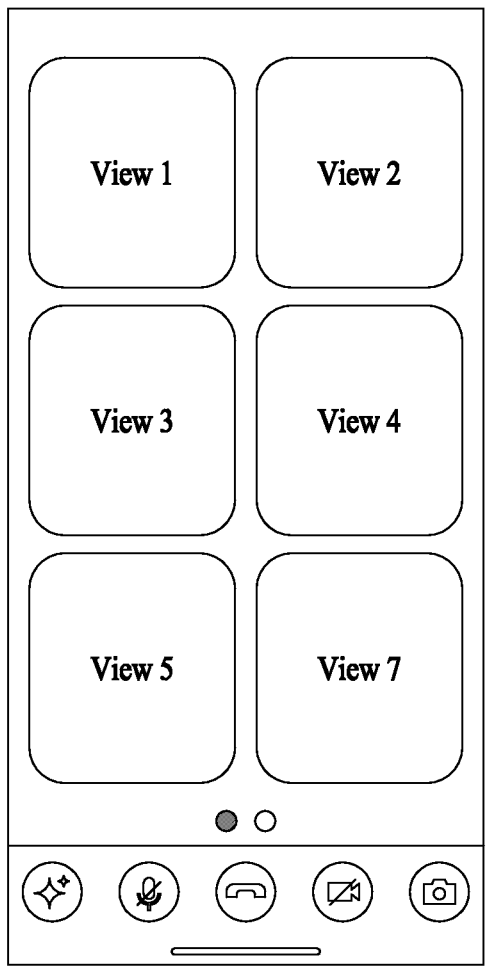
FIGS. 7A and 7B illustrate an example of operations of an application in case a portion of participants leave a group video call.
Figure 7B:
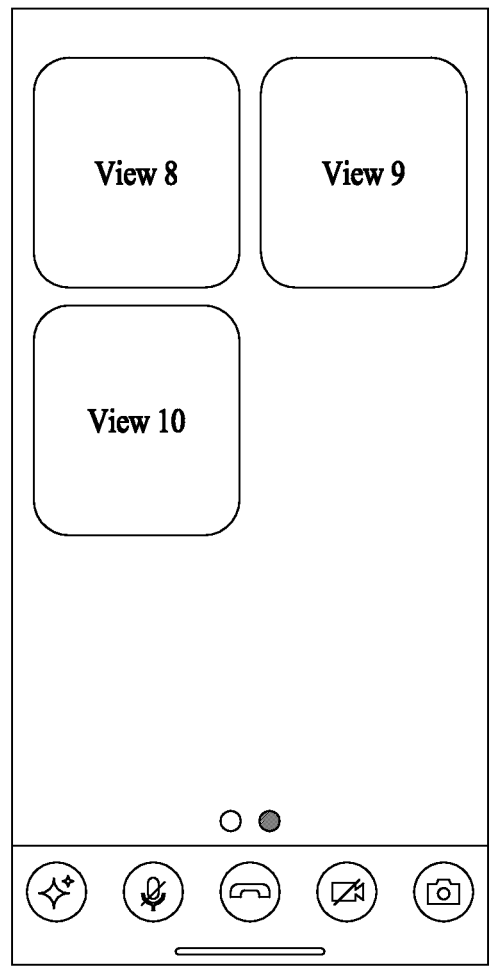

FIGS. 7A and 7B illustrate an example of operations of an application in case a portion of participants leaves a group video call.

A portion of participants may leave a group video call during the group video call. Among the participants in the group video call, when a third participant leaves the group video call, the application may delete the view corresponding to the third participant displayed on one of a plurality of pages. When the view corresponding to the third participant is deleted, the application may rearrange views corresponding to the participants in areas in the pages. When the view corresponding to the third participant is placed on a predetermined page, the application may delete the view corresponding to the third participant from the predetermined page while changing a position of a view corresponding to a fourth participant placed on another page to a position on the predetermined page.

For example, when the first page and the second page displayed on the terminal of the user is configured as shown in FIGS. 2A and 2B and a participant corresponding to View 6 leaves a group video call, the configuration of the first page and the second page displayed on the terminal of the user may be changed to a configuration of pages shown in FIGS. 7A and 7B. Referring to FIG. 7A, View 6 corresponding to the third participant who left the group video call may be removed and a position of View 7 placed on the second page before the third participant left may be changed to a position on the first page. Referring to FIG. 7B, based on a change in a position of View 7, the second page may include three views.

Figure 8:
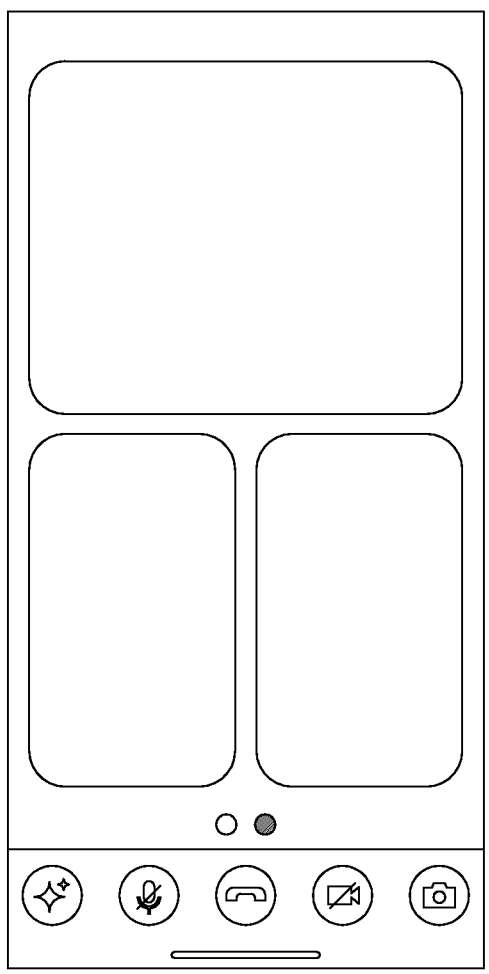
FIG. 8 illustrates an example of a layout of a page.

When a number of views included in a predetermined page changes because a portion of participants leaves, a layout of the predetermined page may change dynamically. For example, when a number of views included in the second page displayed on a terminal of a user changes from four to three because a portion of participants leave, a layout of the second page may be changed from a layout of FIG. 3 to a layout of FIG. 8.

Figure 9:
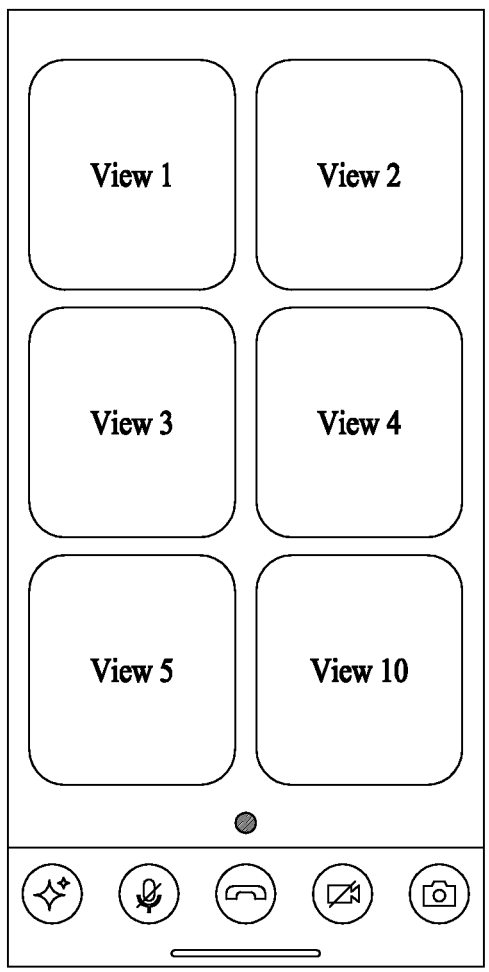
FIG. 9 illustrates an example of operations of an application in case a portion of participants leave a group video call.

FIG. 9 illustrates an example of operations of an application in case a portion of participants leave a group video call.

When deleting a view corresponding to a participant who has left a group video call from a portion of pages displayed on a terminal of a user, the application may delete a page not including a view corresponding to a participant. For example, when the first page and the second page displayed on the terminal of the user are configured as shown in FIGS. 7A and 7B and participants corresponding to Views 7 to 9 have left, a configuration of a page displayed on the terminal of the user may be changed to a configuration of a page shown in FIG. 9. More specifically, views corresponding to the participants who have left may be deleted from the first page and the second page and a position of View 10 placed on the second page may be changed to a position on the first page. As a result, the second page may be deleted since the second page does not include a view corresponding to a participant.

As an interface to display views of participants changes to a single page because a portion of pages is deleted, the first page displayed on the user terminal may not be changed to another page.

The application may generate a new page based on a change in a number of participants as a new participant is added to the group video call. In case a participant is newly added to a group video call, a new page may be generated based on a number of views corresponding to participants included in a page and a limit on a number of views to be included in one page. For example, when a limit on a number of views to be included in one page is six and a participant is newly added to a group video call in which six participants are participating, a new page may be generated to display seven views including a view corresponding to the newly added participant.

When the new participant is added to the group video call, the application may rearrange views corresponding to the participants in the group video call including the view corresponding to the newly added participant on pages including the newly generated page. For example, the view corresponding to the new participant may be placed on a new page.

Figure 10:
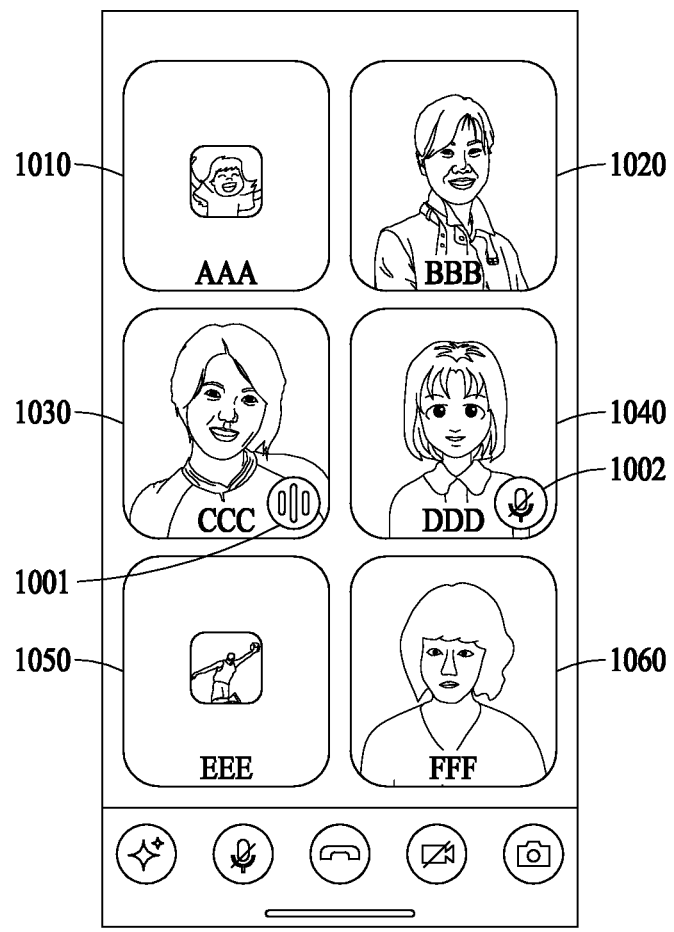
FIG. 10 illustrates an example of an interface to display views of participants of a group video call.

FIG. 10 illustrates an example of an interface to display views of participants of a group video call.

Referring to FIG. 10, a sign 1001 indicating that a participant is currently speaking may be added to a view 1030 corresponding to the currently speaking participant and a sign 1002 indicating that a participant turns on a mute setting may be added to a view 1040 corresponding to the participant who turns on the mute setting.

Referring to FIG. 10, views 1020, 1030, 1040, and 1060 corresponding to a portion of participants may correspond to camera views captured by terminals of the participants, and views 1010 and 1050 corresponding to a portion of other participants may correspond to image views. The image view may include, for example, an image view corresponding to a set profile corresponding to an account of a participant in the application, an image view corresponding to a predetermined image that is set as a default in the application, and an image view corresponding to an image selected by the participant.

A user of the application may set an own view to be displayed to other participants via a UI provided by the application. For example, when the user sets a camera view to be displayed, a view corresponding to the user may be displayed as a camera view on the terminals of participants in a group chatroom and when the user sets an image view to be displayed, the view corresponding to the user may be displayed as a camera view on the terminals of the participants in the group chatroom.

Figure 11A:
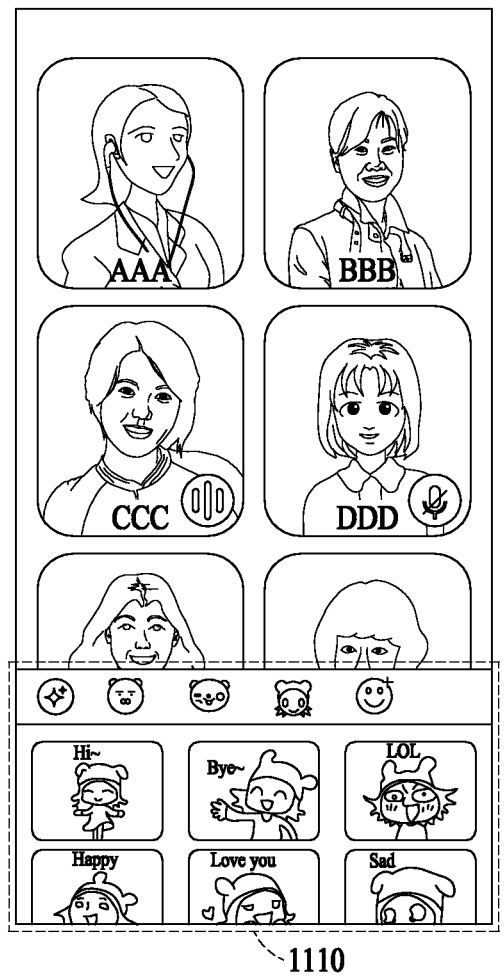
FIGS. 11A to 11C illustrate an example of an interface to transmit and receive an emoticon in a group video call.
Figure 11B:
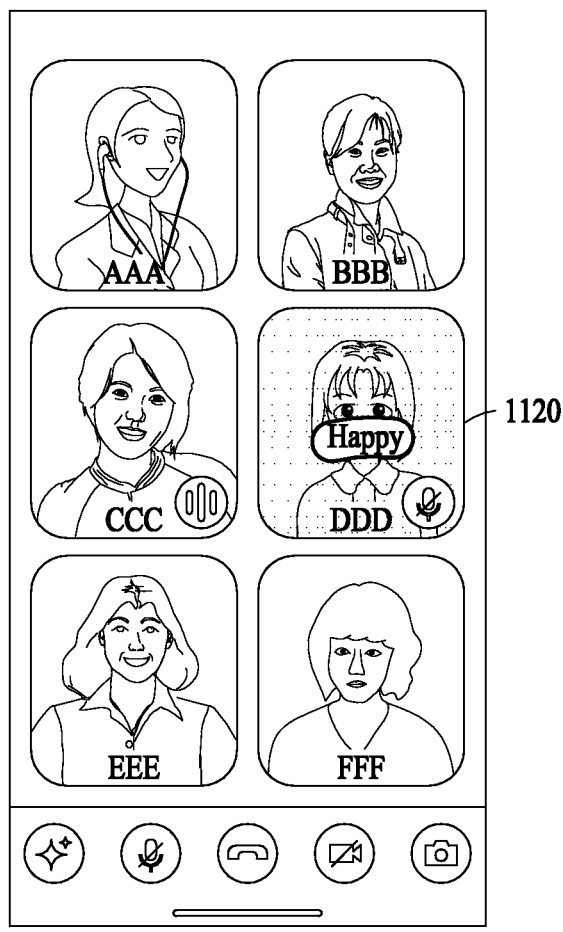
Figure 11C:

FIGS. 11A to 11C illustrate an example of an interface to transmit and receive an emoticon in a group video call.

Referring to FIG. 11A, the application may receive an input for sending an emoticon to a predetermined participant in a group video call from a user. The input for sending an emoticon to a predetermined participant may include an input to select the emoticon to be sent and to select a transmission target via an interface provided by the application. For example, the user may select an emoticon to be sent to another participant via an interface 1110 provided by the application for sending an emoticon. In addition, via an interface that displays views corresponding to participants in a group video call, at least one participant may be selected as a transmission target of the emoticon from among the participants.

Referring to FIG. 11B, based on the input for sending the received emoticon to a predetermined participant, the application may display the emoticon by overlaying the emoticon on a view 1120 corresponding to the participant. Here, the view 1120 corresponding to the participant on which the emoticon is overlayed may be displayed on all terminals of participants in the group chatroom or may be displayed only on the terminal of the participant who sent the emoticon and the terminal of the participant who received the emoticon.

Referring to FIG. 11C, the application may receive an emoticon that is sent to a user from another participant in the group chatroom and may display the received emoticon by overlaying the emoticon on a view 1130 corresponding to the user. Here, the view 1130 corresponding to the user on which the emoticon is overlayed may be displayed on all terminals of participants in the group chatroom or may be displayed only on the terminal of the participant who sent the emoticon and the terminal of the participant who received the emoticon.

An apparatus according to an example may refer to an apparatus for performing at least one operation of providing a group video call described through FIGS. 1 to 11C including a terminal such as a cell phone and a computer. The terminal may include at least one processor and a memory.

The processor of the apparatus may perform an operation of executing the above-described group video call and providing a UI for the group video call. The memory may store data related to executing the above-described group video call and providing the UI for the group video call and may be a volatile memory or a non-volatile memory.

According to an example, the memory may store a program in which the above-described application processing method is implemented, and the processor may execute the program stored in the memory and control the apparatus.

The apparatus may be connected to an external device (for example, a personal computer or a network) through an input/output device to exchange data therewith. For example, the device may receive an input from a user through an input device such as a touch screen, a keyboard, and a microphone, may control a configuration of a screen displayed on a display based on the input of the user, and may transmit the input of the user to a device of another user or a server through a network. In addition, data received from a device of another user or a server through a network may be provided to the user through an output device such as a speaker and a display.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An application processing method of providing a group video call, the application processing method comprising:
   executing a group video call comprising a plurality of participants;
   based on a number of the participants, displaying views corresponding to the participants by pagination;
   based on a predetermined action of a first participant whose view is not displayed on a predetermined page of a plurality of pages generated by the pagination, selecting one of participants whose view is displayed on the predetermined page as a second participant; and
   displaying the view corresponding to the first participant on the predetermined page instead of the view corresponding to the selected second participant.

2. The application processing method of claim 1, wherein the predetermined action of the first participant comprises an utterance of the first participant, and
   the selecting of the second participant comprises, based on at least one of information on recent end-points of utterances and number of utterances of the participants whose views are displayed on the predetermined page, selecting one of participants whose view is displayed on the predetermined page as the second participant.

3. The application processing method of claim 1, further comprising:
   displaying the view corresponding to the selected second participant on a page other than the predetermined page among the plurality of pages.

4. The application processing method of claim 1, further comprising:
   when a third participant among the participants leaves the group video call, deleting a view corresponding to the third participant displayed on one of the plurality of pages; and
   in case the view corresponding to the third participant is deleted from the predetermined page, changing a position of a view corresponding to a fourth participant whose view is not displayed on the predetermined page to a position on the predetermined page.

5. The application processing method of claim 4, further comprising:
   deleting a page not comprising a view corresponding to a participant among the plurality of pages.

6. The application processing method of claim 1, wherein the displaying of the views by the pagination comprises:
   based on a number of the participants, determining a layout of pages on which the views corresponding to the participants are displayed; and
   placing the views corresponding to the participants on areas in the pages based on the layout.

7. The application processing method of claim 1, wherein the displaying of the views by the pagination comprises:
   based on the number of participants and a limit on a number of views to be comprised in one page, generating pages on which the views corresponding to the participants are displayed; and
   placing the views corresponding to the participants on the pages based on a predetermined order among the participants.

8. The application processing method of claim 1, further comprising:
   generating a new page based on a changed number of participants when a new participant is added to the group video call; and
   placing a view corresponding to the new participant on the new page.

9. The application processing method of claim 1, wherein the displaying of the views by the pagination comprises:
   displaying the predetermined page of the plurality of pages generated by the pagination on a display; and
   based on a page transition input received from a terminal in which the application is installed, displaying another page generated by the pagination on the display.

10. The application processing method of claim 1, wherein the executing of the group video call comprises:
    receiving a request for the group video call via a chatroom; and
    executing the group video call comprising a plurality of participants in the chatroom.

11. The application processing method of claim 1, wherein the executing of the group video call comprises:
    receiving a request for the group video call via a chatroom;
    in case a number of the participants in the chatroom exceeds a predetermined value, providing an interface whereby a number of participants less than the predetermined value may be selected from among the participants in the chatroom;
    sending a request to generate a new chatroom comprising the selected participants to a server; and
    executing the group video call comprising participants in the new chatroom.

12. A non-transitory computer-readable storage medium storing instructions that, when executed by a processor, cause the processor to perform the method of claim 1.

13. A terminal comprising:
at least one processor configured to
execute a group video call comprising a plurality of participants,
based on a number of the participants, display views corresponding to the participants by pagination,
based on a predetermined action of a first participant whose view is not displayed on a predetermined page of a plurality of pages generated by the pagination, select one of participants whose view is displayed on the predetermined page as a second participant, and
display the view corresponding to the first participant on the predetermined page instead of the view corresponding to the selected second participant.

14. The terminal of claim 13, wherein the predetermined action of the first participant comprises an utterance of the first participant, and
the processor is configured to, in the selecting of the second participant,
based on at least one of information on recent end-points of utterances and number of utterances of the participants whose views are displayed on the predetermined page, selecting one of participants whose view is displayed on the predetermined page as the second participant.

15. The terminal of claim 13, wherein the processor is further configured to,
display the view corresponding to the selected second participant on a page other than the predetermined page among the plurality of pages.

16. The terminal of claim 13, wherein the processor is further configured to,
when a third participant among the participants leaves the group video call, delete a view corresponding to the third participant displayed on one of the plurality of pages,
in case the view corresponding to the third participant is deleted from the predetermined page, change a position of a view corresponding to a fourth participant whose view is not displayed on the predetermined page to a position on the predetermined page, and
delete a page not comprising a view corresponding to a participant among the plurality of pages.

17. The terminal of claim 13, wherein the processor is further configured to,
generate a new page based on a changed number of participants when a new participant is added to the group video call, and
place a view corresponding to the new participant on the new page.

18. The terminal of claim 13, wherein the processor is further configured to, in the displaying of the views by the pagination,
based on a number of the participants, determine a layout of pages on which the views corresponding to the participants are displayed, and
place the views corresponding to the participants on areas in the pages based on the layout.

19. The terminal of claim 13, wherein the processor is configured to, in the executing of the group video call,
receive a request for the group video call via a chatroom,
in case a number of the participants in the chatroom exceeds a predetermined value, provide an interface whereby a number of participants less than the predetermined value may be selected from among the participants in the chatroom,
send a request to generate a new chatroom comprising the selected participants to a server, and
execute the group video call comprising participants in the new chatroom.

\* \* \* \* \*